United States Patent [19]
Matsuura

[11] 3,868,027
[45] Feb. 25, 1975

[54] AUTOMOTIVE VEHICLE STORING APPARATUS FOR PARKING

[76] Inventor: Takashi Matsuura, 28-4 Izumi 2-Chome, Tokyo, Japan

[22] Filed: Mar. 5, 1974

[21] Appl. No.: 448,433

[30] Foreign Application Priority Data
Mar. 24, 1973 Japan................................ 48-33866

[52] U.S. Cl............. 214/16.1 B, 198/110, 198/154
[51] Int. Cl................................................ E04h 6/06
[58] Field of Search. 214/16.1 B, 16.1 BA, 16.1 BB; 198/110, 154, 156–158

[56] References Cited
UNITED STATES PATENTS

| | | | |
|---|---|---|---|
| 1,771,022 | 7/1930 | Wachs et al.................... | 214/16.1 B |
| 2,761,572 | 9/1956 | Baker............................ | 214/16.1 B |
| 2,856,081 | 10/1958 | Zahq............................. | 214/16.1 B |
| 2,878,921 | 3/1959 | Clark............................. | 214/16.1 B |
| 3,405,795 | 10/1968 | Mascherpq ..................... | 198/138 |
| 3,795,328 | 3/1974 | Buttironi....................... | 214/16.1 B |

FOREIGN PATENTS OR APPLICATIONS

| | | | |
|---|---|---|---|
| 719,154 | 3/1942 | Germany....................... | 214/16.1 B |

Primary Examiner—Robert J. Spar
Assistant Examiner—R. B. Johnson
Attorney, Agent, or Firm—Ladas, Parry, Von Gehr, Goldsmith & Deschamps

[57] ABSTRACT

An automotive vehicle storing apparatus for parking comprising two pairs of driving wheels on which endless chains are mounted, and two pairs of upper and lower horizontal rails on which a plurality of pallets travel circulatingly in two layers by means of rollers from which they hang. The apparatus further comprises two pairs of wheels each fixed to each of the driving wheels on the same axle. The diameter of the wheel is larger than that of the driving wheel. Both kinds of wheels have the same number of angularly equally spaced pheripheral notches. Link bodies each fixed to the endless chain is coupled to the shaft of the roller. The extensions of the shafts of the rollers and the connection pins of the endless chain engage with the notches of the wheels and the driving wheels, whereby the descending and ascending motion of the pallets is accelerated more than the motion of the driving wheels to enable the reduction of the intervals between the pallets and the overall height of the apparatus.

4 Claims, 10 Drawing Figures

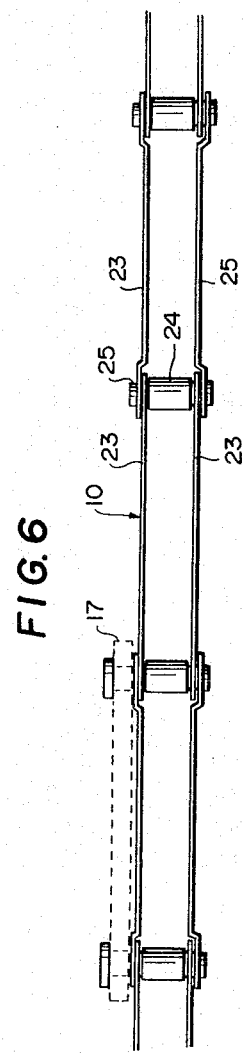
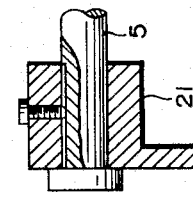
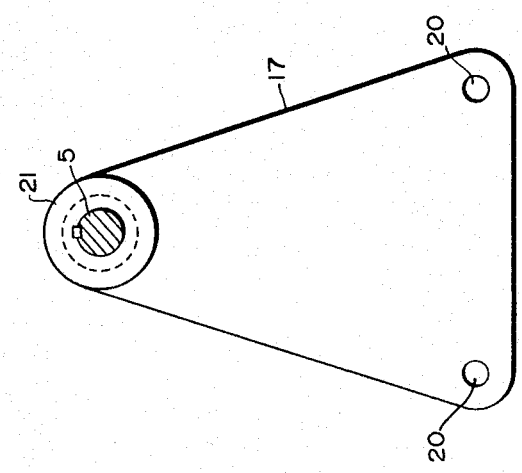

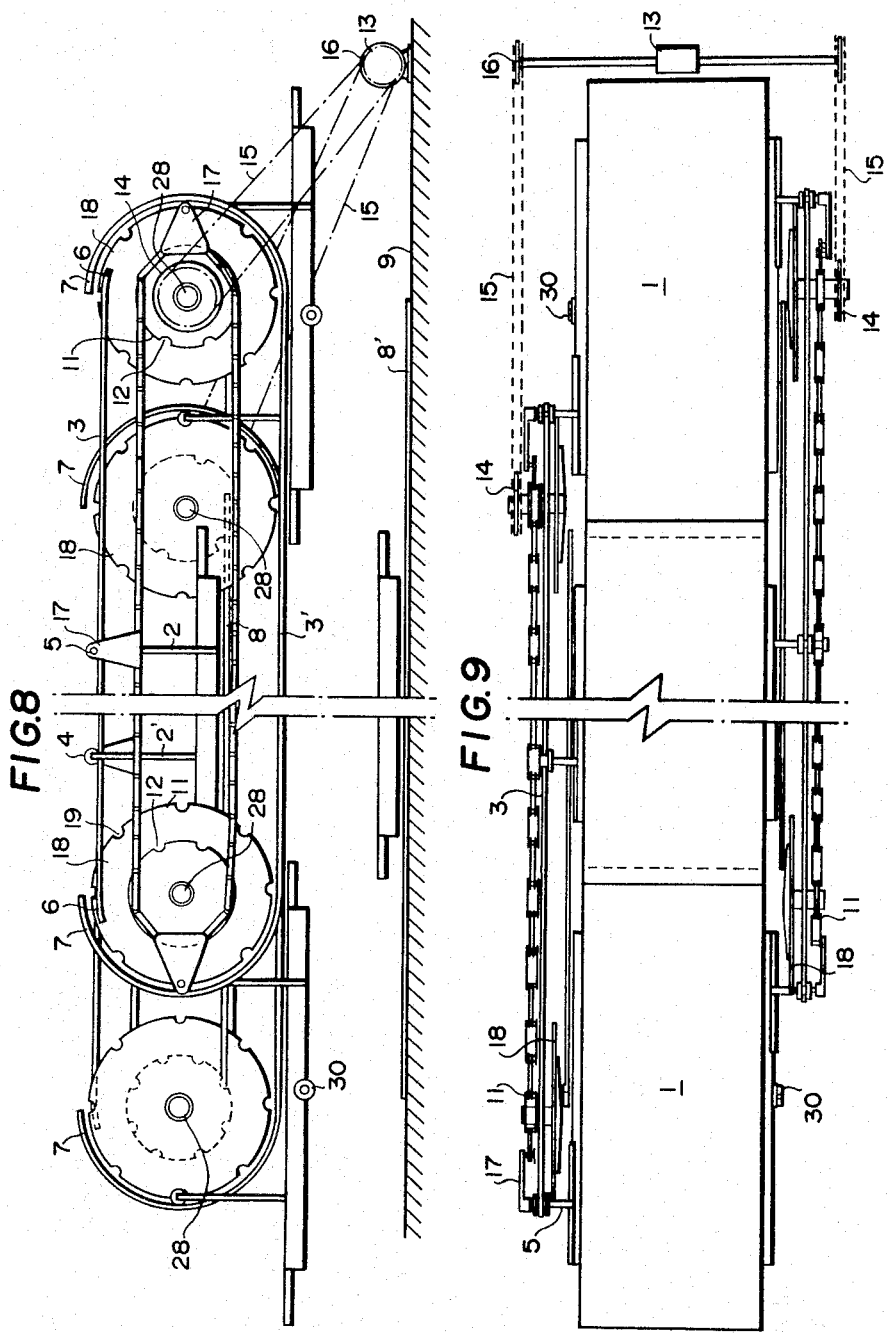

AUTOMOTIVE VEHICLE STORING APPARATUS FOR PARKING

The present invention relates to an automotive vehicle parking shed or garage in which a plurality of pallets on each of which an automotive vehicle is parking circulate continuously through upper and lower two paths making two layers of storage.

There have been proposed various automotive vehicle parking sheds of this kind in which pallets circulate through upper and lower paths making two layers of storage. However, they do not satisfy sufficiently the requirements that the occupation space of the apparatus is as low as possible, the mechanism thereof is simple, and the operation thereof is sure and safe.

In view of the above disadvantages of the prior art apparatuses, the present invention is intended to store as many automotive vehicles as possible in a predetermined space, in other words, to provide an automotive vehicle storing apparatus having a reduced occupation space with a simple structure and capable of operating safely and surely.

According to the present invention there is provided an automotive vehicle storing apparatus for parking comprising two pairs of upper and lower parallel horizontal rails, two pairs of driving wheels arranged at end portions of and between the upper and lower rails, two endless chains mounted on the pairs of driving wheels, and a plurality of pallets travelling on the rails by means of rollers, each of the pallets hanging rotatably from the shaft of the roller, characterized in that it comprises two pairs of wheels each fixed to each of the driving wheels and having a larger diameter than that of the driving wheel, and a plurality of link bodies each linking one side rail and endless chain and belonging to each of the pallets, the wheels and the driving wheels have the same number of angularly equally spaced notches on their peripheries, each of the link bodies is coupled to the shaft of the roller and fixed to the endless chain, the latter fixation being made by means of at least one pin, and the notches of the wheel engage with the shafts of the rollers and, at the same time, the notches of the driving wheel engage with the pins of the link bodies when the driving wheels are driven, whereby the pallets travel on the upper and lower pairs of rails alternately and circulatingly.

The above and other objects, features and advantages of the present invention will become more apparent from the following detailed description of the preferred embodiments of the present invention when taken in conjunction with the accompanying drawings, in which:

FIG. 6 is a plan view of a chain used in the present invention;

FIG. 7a is an elevational view of a link body used in the present invention;

FIG. 7b is a side view of the link body of FIG. 7a;

FIG. 8 is an elevational view of another embodiment of the present invention; and FIG. 9 is a plan view of the embodiment of FIG. 8.

Figure 1:
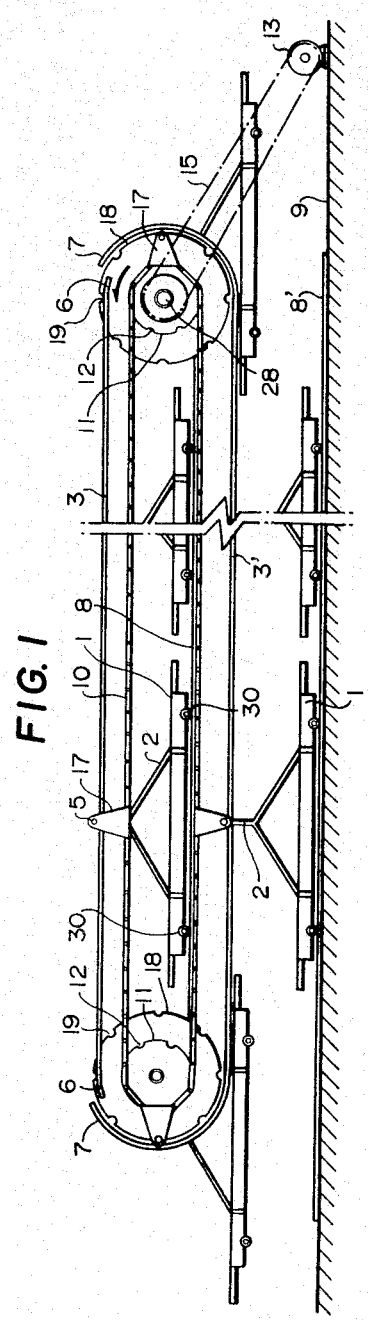
FIG. 1 is an elevational view of an embodiment of the present invention.

In the embodiment of FIG. 1 a pallet 1 carries an automotive vehicle and circulates through the upper and lower paths. The pallet 1 is suspended at its each side by means of a suspension rod 2 from the shaft 5 of a roller 4 rotatingly moving on each of the upper and lower pairs of parallel and horizontal rails 3 and 3'. The rails 3 and 3' are mounted on a stout framework 26.

Figure 4:
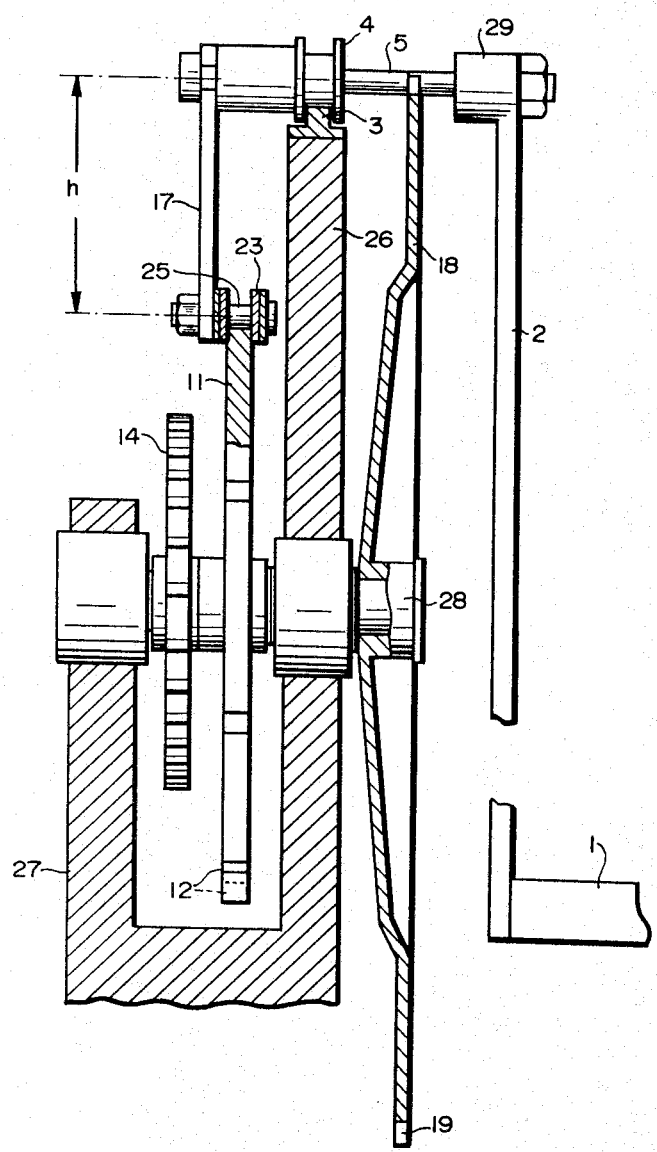
FIG. 4 is a cross-sectional view of a part of the embodiment of FIG. 1.

Referring to FIG. 4 a wheel 18 and a driving wheel 11 are fixed to an axle 28 rotatably supported by the framework 26 and 27. The wheel 18 is arranged on the inner side (on the pallet side) of the framework 26 and the rail 3, while the driving wheel 11 is arranged on the outer side thereof.

Figure 5:
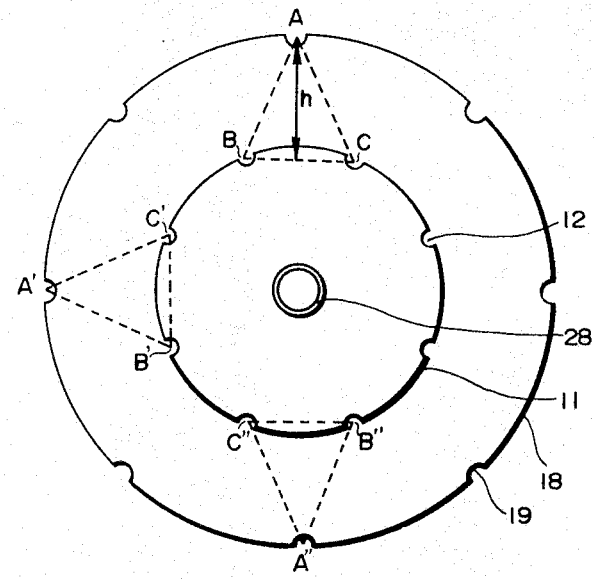
FIG. 5 is an elevational view of a driving wheel and a wheel used in the present invention.

Referring to FIG. 5 the driving wheel 11 is smaller than the wheel 18 in the diameter and has angularly equally spaced notches 12 on the periphery. Also the wheel 18 has angularly equally spaced notches 19 on the periphery. The notches 12 and 19 are arranged such that they angularly bisect each other.

On the right- and left-hand side driving wheels 11 is mounted an endless chain 10 consisting of relatively long links 23 connected by double pins 25 as shown in FIG. 6. The length of the links 23 and the intervals of the notches 12 of the driving wheel 11 are determined such that the adjacent pins 25 of the endless chain 10 fit in the adjacent notches 12 of the driving wheel 11.

FIGS. 7a and 7b show a link body 17 linking the shaft 5 of the roller 4 and the chain 10. The link body 17 is an isosceles triangular plate provided with a boss 21 at its top portion and having a hole 20 for pin insertion at each end portion of the bottom side. The shaft 5 of the roller 4 is inserted in the boss 21 fixedly or rotatably. The extensions of the adjacent two pins 25 of the chain 10 are inserted in the holes 20 of the link body 17 to link the link body 17 to the chain 10 (FIGS. 4 and 6).

On the shaft 28 of the right-hand side wheel 18 and driving wheel 11 in FIG. 1 is fixed a sprocket 14 on which a chain 15 which is driven by a driving motor 13 is mounted. The reduction gearing of the electric motor 13 is not shown.

The pallet 1 is equipped with front and back wheels 30 on both sides. In the state that the pallet 1 is supported by and suspended from the upper rails 3 the wheels 30 roll on horizontal rails 8, while when it is supported by the lower rails 3', the wheels 30 roll on rails 8' laid on the floor 9.

Figure 2:
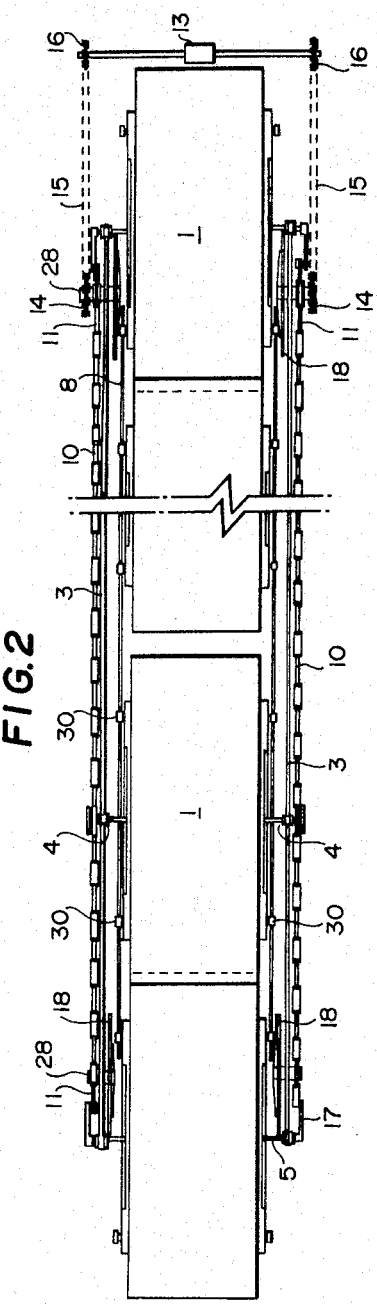
FIG. 2 is a plan view of the embodiment of FIG. 1.
Figure 3:
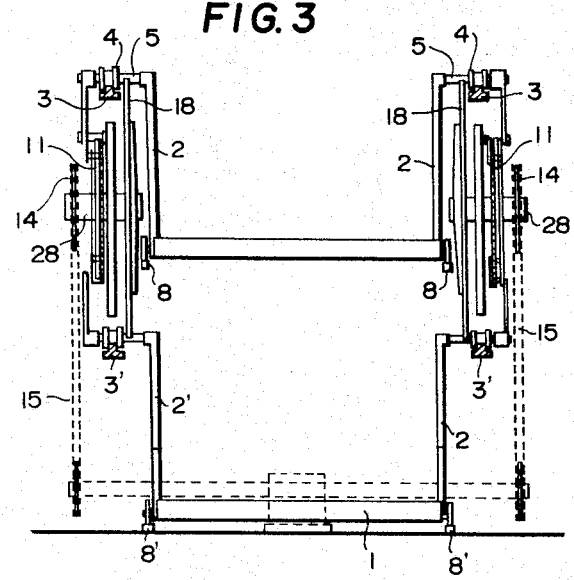
FIG. 3 is a side view of the embodiment of FIG. 1.

Another embodiment of the present invention is shown in FIGS. 8 and 9 in which the structure is the same as the embodiment of FIGS. 1 and 2 except that the driving and transporting mechanism on one side in the lateral direction is shifted in a horizontal and parallel direction relative to that on the other side. The amount of the shift or the discrepancy is determined appropriately depending on the length of the pallet 1 or the like. It is desirable that in conformity with the discrepancy between the driving and transporting mechanisms also the suspension rods 2 on both sides of the pallet 1 are shifted relative to each other to stabilize the suspension. The wheels 30 on each side of the pallet 1 may be reduced to only one wheel at the center to stabilize the running of the pallet 1.

In operation, the axle 28, and hence the wheel 18 and the driving wheel 11 fixed thereto are rotated by the driving electric motor 13 through the chain 15 and the sprocket 14 engaging therewith. Since on the driving wheels 11 the endless chain 10 is mounted with its pins 25 in engagement with the notches 12 of the driving wheels 11, the other driving wheel 11 is rotated at the same speed as the former driving wheel 11. Thus, all of the driving wheels 11 and the wheels 18 are driven at the same angular velocity.

Since, as described above, the pallet 1 is suspended by the suspension rod 2 on each side, since the top part of the suspension rod 2 is connected to the shaft 5 which is linked with the link body 17 which in turn is coupled to the endless chain 10, and since the shaft 5 fits in the roller 4, the rollers 4, the shafts 5, the link bodies 17, the suspension rods 2, and the pallet 1 are driven in a horizontal direction as an integral unit supported by the rails 3 or 3' when the chain 10 is driven to run. The rollers 30 of the pallet 1 are also supported by the rails 8 or 8' to stabilize the travelling of the pallet 1.

When the shafts 5 and the coupling pins 25 engage simultaneously with the notches 19 of the wheels 18 and the notches 12 of the driving wheels 11, respectively, in other words, when the pallet 1 is going down between its upper horizontal travelling on the rails 3 and the lower horizontal travelling on the rails 3', the link bodies 17 are rotated by the driving wheels 11 and, simultaneously therewith, the shafts 5 are rotated also by the driving force by the wheels 18 by the engagement with the notches 19 of the wheels 18 to bring down the pallet 1.

If the supported centers of the link body 17 by the notches 19 and 12 of the wheel 18 and the driving wheel 11, respectively, are indicated by reference characters A, B and C, the link body 17 which can be represented by the $\triangle ABC$ is rotated as from $\triangle ABC$ to $\triangle A'B'C'$ to $\triangle A''B''C''$ with the rotation of the driving wheel 11. In this rotating motion, the points B and C perform a circular motion at the linear or peripheral speed of the driving wheel 11 the same as the travelling speed of the chain 10, while the point A which corresponds to the supporting point of the pallet 1 moves at a higher linear speed than that of the points B and C though the angular velocities thereof are the same because the diameter of the wheel 18 is larger than that of the driving wheel 11. Thus, the pallet 1 which is suspended from the point A goes down rapidly.

By this rapid going down of the pallet 1 the interval between adjacent pallets can be reduced to a very narrow one. This is because, when a pallet begins its rapid descent by the wheel 18, it is accelerated compared with the succeeding one to increase the horizontal interval therebetween and then the vertical interval so that the contact between the preceding and the succeeding pallets can be avoided rapidly.

In a conventional two-upper-and lower-layer-circulating automotive vehicle storing apparatus it is difficult to reduce the intervals between the pallets. To overcome this difficulty a complicated mechanism has been employed. However, the present invention has overcome this difficulty with a very simple structure. This is a feature of the present invention.

As is apparent from FIGS. 4 and 5, if the supporting shaft 5 of the suspension rod 2 moves from the position A to the position A'' in FIG. 5, the pallet 1 goes down the vertical distance larger than that of the supporting shaft 5 which corresponds with the diameter of the wheel 18 by the height $h$ of the link body 17. That is, in addition to the above-described rapid descending, the pallet goes down a gradually increasing additional vertical distance to the vertical moving distance of the supporting shaft 5, the additional distance amounting to the maximum value $h$ when the supporting shaft 5 reaches the point A'', in other words, when it reaches the horizontal part of the lower rail 3'. This fact means that the vertical distance from the succeeding pallet increases more rapidly and is further effective to prevent the interference with the succeeding pallet. At the same time the fact that the suspension distance increases when the pallet runs horizontally on the lower rails enables the distance between the upper and lower rails to be made small so that the less the overall height of the apparatus can be made. This is another feature of the present invention.

It will be easily understood that the same is true of the ascending operation of the pallet, too.

The number of the shaft supporting the pallet, and hence the suspension rod on each side of the pallet is one, so that such a complicated switching mechanism for the back supporting shaft is unnecessary as is the case with a conventional apparatus in which there are two supporting shafts on each side of the pallet. Thus, according to the present invention the structure is much simplified.

In the above embodiment of the present invention the link body 17 is made triangular and its link with the chain is made by means of two pins to stabilize the pallet support. However, the link may be made with a single pin.

If the end portions 6 and 7 of the upper and lower rails 3 and 3' are bent as shown in FIG. 1, they guide the rollers 4 in ascending and descending of the pallet to prevent the derailment of the rollers and the shake of the pallet.

In the embodiment of FIGS. 8 and 9, since one side of the pallet is open when an automotive vehicle rides on an end pallet, it is convenient for the opening of the door of the vehicle and person's getting on and off the vehicle.

Since the ascending and descending operations of the pallet are acclerated as described above, the pallet is apt to swing during these operations. In such a case, if rollers and guide rails matching the travelling locus of the pallet are appropriately provided on the sides of the pallet, such a swinging of the pallet can be prevented.

What is claimed is:

1. An automotive vehicle storing apparatus for parking comprising two pairs of upper and lower parallel horizontal rails, two pairs of driving wheels arranged at end portions of and between the upper and lower rails, two endless chains mounted on the pairs of driving wheels, rollers with a shaft thereon; and a plurality of pallets travelling on said rails by means of said rollers, each of the pallets hanging rotatably from the shaft of the roller, characterized in that it comprises two pairs of wheels each fixed to each of the driving wheels and having a larger diameter than that of the driving wheel, and a plurality of link bodies each linking one side rail and endless chain and belonging to each of the pallets, the wheels and the driving wheels have the same number of angularly equally spaced notches on their peripheries, each of the link bodies is coupled to the shaft of the roller and fixed to the endless chain, the latter fixation being made by means of at least one pin, and the notches of the wheel engage with the shafts of the rollers and, at the same time, the notches of the driving wheel engage with the pins of the link bodies when the driving wheels are driven, whereby the pallets travel on the upper and lower pairs of rails alternately and circulatingly.

2. An apparatus according to claim 1, characterized in that the wheels are arranged inner side of the rails and the driving wheels are arranged outer side of the rails.

3. An apparatus according to claim 1, characterized in that the driving and transporting mechanism comprising the driving wheels, the wheels, the endless chain, and the rails on one side of the apparatus in the lateral direction is shifted in a horizontal and parallel direction relative to that on the other side.

4. An apparatus according to claim 1, characterized in that the link body is an isosceles triangular plate, the top thereof being coupled to the shaft of the roller, both ends thereof being fixed to two connection pins of the endless chain, and the notches of the wheel and the notches of the driving wheel are in angularly bisecting relationship with each other.

* * * * *